April 7, 1964  M. B. ANDERSEN  3,128,090

FIXTURE FOR CHUCKING COMPONENTS

Filed May 28, 1962

INVENTOR:
Max B. Andersen

By William M. Nelson
Agent

United States Patent Office 3,128,090
Patented Apr. 7, 1964

3,128,090
FIXTURE FOR CHUCKING COMPONENTS
Max B. Andersen, Gardena, Calif., assignor to Northrop Corporation, Beverly Hills, Calif., a corporation of California
Filed May 28, 1962, Ser. No. 198,319
6 Claims. (Cl. 269—7)

This invention pertains to fixtures and more particularly to a fixture including a confined eutectic alloy cooperating with the fixture to rigidly retain a part therein enabling an extremely exacting machine operation to be performed thereon.

Quite frequently an alloy of maximum fusibility is utilized to rigidly secure a component in a fixed relation in a fixture or similar apparatus so that an exacting machine operation may be performed thereon. To the best of applicant's knowledge, in cases where a low melting point material has been employed for the above purpose the material has been utilized in an unconfined state. Utilizing a low melting point or eutectic material in an unconfined state is uneconomical, time consuming and troublesome.

Accordingly it is an object of the present invention to provide a fixture including a confined alloy of maximum fusibility adapted to rigidly retain a part therein whereby an exacting machine operation can be performed on the part.

Another object is to provide a fixture including a confined alloy of maximum fusibility adapted to rigidly retain a part and preclude lateral and longitudinal movement thereof with respect to the fixture.

Another object is to provide a fixture including a confined alloy of maximum fusibility adapted to rigidly secure a part therein, which eliminates, at least for the most part, the use of clamps and similar restraining devices.

Another object is to provide a fixture including a confined alloy of maximum fusibility adapted to rigidly retain a part therein and which is economical from a time and wastage standpoint.

Another object is to provide restraining apparatus which is simple in design, rugged in construction and which may be easily adapted to any purpose for which it is intended.

Although the characteristic features of the present invention are particularly pointed out in the appended claims, the invention itself, also the manner in which it may be carried out, will be better understood by referring to the following description taken in connection with the accompanying drawings forming a part of this application and in which:

Figure 1:
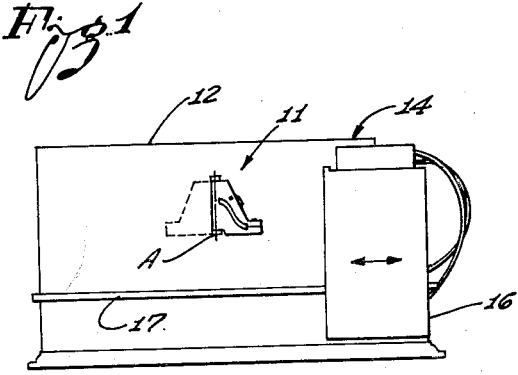
FIGURE 1 is a side elevational view of a horizontal milling machine having a holding fixture as disclosed herein mounted thereon.

Referring to the drawings, the improved holding fixture 11 as disclosed herein is shown in FIGURE 1 in its mounted relationship on the vertical bed 12 of a horizontal milling machine 14. It should be understood that the fixture 11 may be utilized per se and in many other environments other than that shown in FIGURE 1, the milling machine 14 merely illustrates one machine with which the fixture may be utilized.

The machine 14 includes a traveling head 16 adapted to move bi-directionally on the ways 17 and thus place tools (not shown) carried by the head in proper position to perform a machining operation on a component carried by the fixture 11. The fixture 11 is mounted for pivotal movement on the bed 12 about a vertical axis "A" between right and left hand positions as shown by solid and dotted line construction, respectively, in FIGURE 1.

Figure 2:
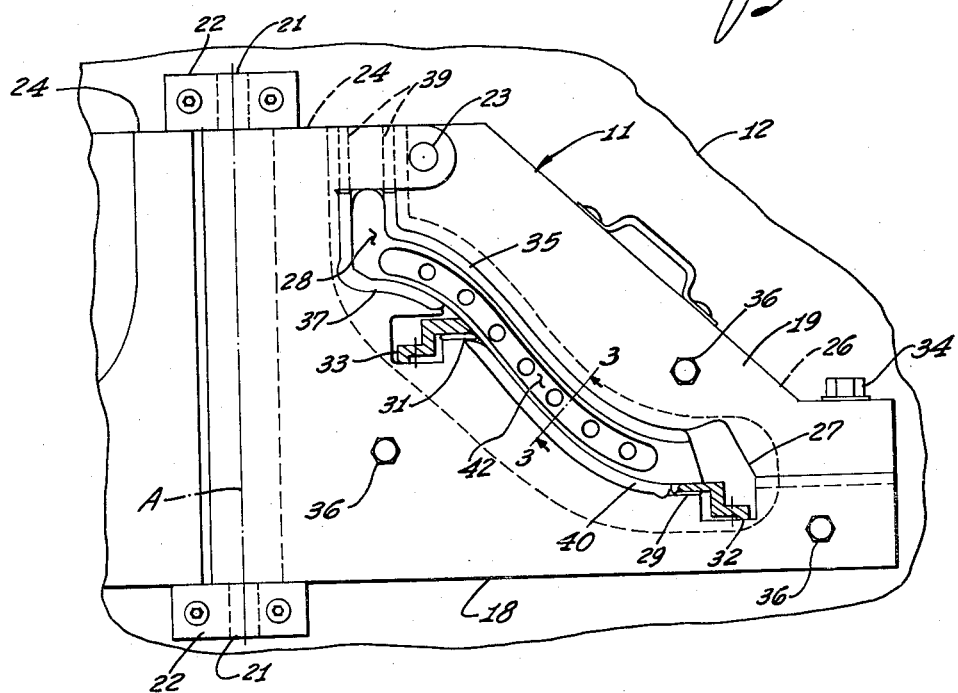
FIGURE 2 is a fragmentary view of FIGURE 1 showing a side elevational view in detail of the holding fixture.

It will be seen by referring to FIGURE 2 that the fixture 11 consists of a body portion and a hinged portion 18 and 19, respectively. The body portion 18 is provided with trunnion-like supports 21—21 received in pillow blocks 22—22 which in turn are secured to the bed 12, the supports 21 providing means allowing the fixture 11 to be rotated between its aforementioned right and left-hand positions. The portion 19 is pivotally attached to the portion 18 by means of a pin 23. In the assembled relation of the portions 18 and 19 respective side faces thereof are located in common planes. Thus, at such time as the fixture 11 is in its right hand position shown in FIGURE 2 or rotated to its left-hand position, the side faces of the portions 18 and 19 will have a flush contacting relation with plate-like filler members 24 and 26 which in turn are rigidly secured to the bed 12.

It will be seen by referring to FIGURE 2 that clearance is provided between the portions 18 and 19 at such time as these portions are in their assembled relation, that is the portion 19 is bottomed on the portion 18. In the embodiment shown the aforementioned clearance provides a cavity or opening 27 adapted to receive a component to be machined, in this case a crank or cam member 28 is shown therein.

The member 28 may easily be placed in the opening 27 at such time as the portion 19 is rotated on the pin 23 to an elevated position (not shown). While the portion 19 is in its elevated position the member 28 is positioned in the portion of the opening 27 formed in the portion 18. Location of the member 28 is accomplished by means of locating pads 29 and 31 and temporarily held in this position by means of clamps 32 and 33.

The portion 19 is then lowered to its bottomed position on the portion 18 and rigidly secured in this position by screw means 34. The portions 18 and 19 are also rigidly secured to the members 24 and 26 by means of cap screws 36 or the like. With the member 28 thus secured in the opening 27 it will be seen that clearance is provided around the member 28.

Flexible plastic bags or sleeves 35, 37 and 40, constructed of polyvinyl fluoride or similar material, are positioned in the clearance space provided between the member 28 and portions 18 and 19. The sleeves are positioned around major peripheral portions of the member 28 as best seen in FIGURE 2. In positioning the sleeves in the clearance space referred to above they assume a fairly flat configuration in cross-section as shown in FIGURES 3 and 4.

As positioned in the fixture 11, the open end of each sleeve is positioned uppermost and, therefore, may be readily filled with a eutectic alloy. The sleeves 35, 37 and 40 are open at one end and closed at the other. To effect the filling of the sleeves 35 and 37, bores 39, formed in the portion 18 at locations directly above the open ends thereof, are provided in the portion 18. It will now be apparent that a funnel (not shown) may be inserted in the bores 39 and the sleeves 35 and 37 filled with the aforementioned alloy while in a liquid state. The restricted portion of the aforementioned funnel may be inserted in the open end of the sleeve 40, or in a side portion thereof extending laterally beyond the member 28 and portion 18, and thus the sleeve 40 can also be filled with the alloy 38.

The alloy 38 is commonly referred to as a eutectic alloy. A material having melting and solidifying temperatures of approximately 117 and 105 degrees centigrade, respectively, is suitable for this purpose. A eutectic alloy which may be utilized for this purpose is available under the trade name "Cerro-Low 117."

Figure 3:
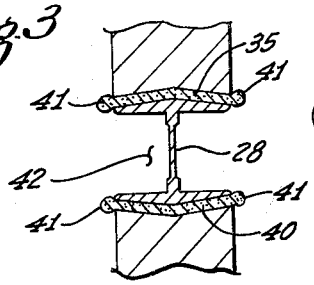
FIGURE 3 is a sectional view of the fixture shown in FIGURE 2 taken along the line 3—3 of FIGURE 2.
Figure 4:
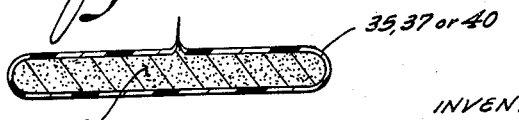
FIGURE 4 is a cross-sectional view of one of the sleeve members shown in FIGURE 2 containing eutectic material.

It will be noticed by referring to FIGURE 3 that the longitudinal edges of the sleeves 35, 37 and 40 overhang or extend beyond the flange of the member 28 and the side faces of the portions 18 and 19. Eutectic material fills the sleeves including the overhanging portions causing them to provide bead-like members 41 on each side of the fixture which, when the eutectic material is solidified, preclude lateral movement of the member 28 with respect to the portions 18 and 19.

Thus it will be seen that the eutectic material 38, confined in the sleeves 35, 37 and 40, provides a firm support between the member 28 and portions 18 and 19 and also precludes lateral movement thereof with respect to the portions 18 and 19. With the member 28 supported in this manner a very exacting machine operation may be performed on the member 28. In fact, the present facility makes possible the machining of the inside of the flanges defining the slot 42 in one operation with a tolerance of two thousands (.002) of an inch.

From the foregoing discussion it will be apparent that the method of utilizing a eutectic alloy as disclosed herein is more economical and expedient than if it was used in an unconfined state. For example, after a machining operation has been effected on a component the portion 19 is moved to its elevated position and the part 28 and sleeves 35, 37 and 40 removed from the fixture 11. The temperature of the alloy in the sleeves is now elevated sufficiently to cause the alloy to assume a liquid state. The eutectic alloy can then be poured from the sleeves into a suitable container and reused in a subsequent operation. This procedure would not be possible if the alloy was not confined.

While in order to comply with the statute, the invention has been described in language more or less specific as to structural features, it is to be understood that the invention is not limited to the specific features shown, but that the method and means herein disclosed comprise several forms of putting the invention into effect, and the invention is therefore claimed in any of its forms or modifications within the legitimate and valid scope of the appended claims.

What is claimed is:

1. Apparatus adapted to provide firm and rigid support for a component mounted therein comprising: a fixture having an opening therein adapted to receive a component on which a machine operation is to be performed; a plurality of elongated flexible sleeves positioned against the outer sides of said opening and adapted to contact and surround major peripheral portions of said component; and a filling of a solid eutectic material in said sleeves.

2. Apparatus as set forth in claim 1: in which said sleeves are of plastic material, each said sleeve being fluid tight at one end and open at the other end for allowing filling of said eutectic material when fluid.

3. Apparatus adapted to provide firm and rigid support for a component mounted therein comprising: a plate-like fixture of predetermined thickness and having an opening therethrough; said opening being of a size and shape allowing a component to be mounted therein with clearance around the component; a plurality of elongated flexible sleeves positioned in said clearance against the outer walls of said opening and adapted to contact and surround major peripheral portions of the component located in said opening; and a filling of removable solid eutectic material in said sleeves to render said component immovable with respect to said fixture.

4. Apparatus as set forth in claim 3: in which each of said sleeves has an uppermost end as assembled, said sleeves being closed except for means at said uppermost ends for admitting said eutectic material when fluid.

5. Apparatus as set forth in claim 4: in which the width of said sleeves exceeds the thickness of said plate-like fixture at such time as said sleeves contain eutectic material and are mounted in said fixture whereby said sleeves include elongated bead-like portions on each side of said fixture functioning to resist lateral movement of said component in said fixture.

6. Apparatus adapted to provide firm and rigid support for a component mounted therein comprising: a plate-like fixture including a body portion and a hinged portion; said hinged portion being mounted on said body portion for pivotal movement between a disengaged and a bottomed position in which said hinged portion has a bottomed relation on said body portion; said body and hinged portions defining an opening extending between the side faces of said fixture; said opening being of a size allowing a component to be mounted therein with clearance around the component at such time as said hinged portion is in said bottomed position; a plurality of elongated flexible sleeves positioned in said clearance and adapted to surround and contact major peripheral portions of the component located in said opening; and a filling of solid eutectic material in said sleeves to render said component immovable with respect to said fixture.

References Cited in the file of this patent

UNITED STATES PATENTS

| 525,243 | Vare | Aug. 28, 1894 |
| 758,838 | Hermann | May 3, 1904 |
| 2,613,243 | Frear | Oct. 7, 1952 |

FOREIGN PATENTS

| 456,503 | Great Britain | Nov. 10, 1936 |